(12) United States Patent
Jentsch et al.

(10) Patent No.: US 8,756,567 B2
(45) Date of Patent: Jun. 17, 2014

(54) PROFILE BASED VERSION COMPARISON

(75) Inventors: Frank Jentsch, Muehlhausen (DE);
Frank Brunswig, Heidelberg (DE);
Baré Said, St. Leon (DE)

(73) Assignee: SAP AG, Walldorf (DE)

( * ) Notice: Subject to any disclaimer, the term of this patent is extended or adjusted under 35 U.S.C. 154(b) by 314 days.

(21) Appl. No.: 13/273,253

(22) Filed: Oct. 14, 2011

(65) Prior Publication Data

US 2013/0097585 A1 Apr. 18, 2013

(51) Int. Cl.
*G06F 9/44* (2006.01)

(52) U.S. Cl.
USPC .......................................................... 717/122

(58) Field of Classification Search
USPC .......................................................... 717/122
See application file for complete search history.

(56) References Cited

U.S. PATENT DOCUMENTS

| 8,001,083 | B1* | 8/2011 | Offer | 707/636 |
|---|---|---|---|---|
| 2007/0282805 | A1* | 12/2007 | Janzen | 707/3 |
| 2008/0005184 | A1* | 1/2008 | Myllyla et al. | 707/200 |
| 2010/0042660 | A1* | 2/2010 | Rinearson et al. | 707/203 |
| 2010/0325613 | A1* | 12/2010 | Bush et al. | 717/120 |
| 2012/0317075 | A1* | 12/2012 | Pasumarthi et al. | 707/626 |

* cited by examiner

*Primary Examiner* — Qing Chen
*Assistant Examiner* — Clint Thatcher (57) ABSTRACT

Various embodiments of systems and methods to compare different versions of a development object based on a version comparison profile are described herein. Identities of the different versions of the development object are received. Further, a version comparison profile and a corresponding profile definition associated with the development object are received. Furthermore, the different versions of the development object are compared to determine one or more differences based upon the received version comparison profile and the corresponding profile definition. The determined one or more differences between the different versions of the development object are returned.

20 Claims, 9 Drawing Sheets

METADATA REPOSITORY: DISPLAY BUSINESS OBJECT FIA_FIXED_ASSET — 300A

| BUSINESS OBJECT | FIA_FIXED_ASSET 310A |
| --- | --- |
| NODE NAME | SOB_VALVIEW_LINE_ITEM 315A |

OVERVIEW / DESCRIPTION / ELEMENT STRUCTURE / ELEMENTS / ASSOCIATIONS / ACTIONS / QU

| DATA TYPE ELEMENT PATH | REFERENCE |
| --- | --- |
| GENERAL LEDGER MOVEMENT TC - CONTENT | FIAS GL MOVEMENT TYPE CO |
| DEBIT CREDIT CODE 325 | FIAS FXA SOB VALVIEW LIT |
| GL EXCLUDED INDICATOR | FIAS FXA SOB VALVIEW LIT |
| CANCELLATION DOCUMENT IND | FIAS FXA SOB VALVIEW LIT |
| CANCELLED INDICATORE | FIAS FXA SOB VALVIEW LIT |
| AN POST PARMS EX SPECIFIED IND | |

COMPARE CURRENT VERSION WITH PREVIOUS VERSION

CURRENT VERSION SELECTION 410

| SOFTWARE COMPONENT | | TO | |
| COMPONENT ID | | TO | |
| TRANSPORT LAYER | | TO | |
| PACKAGE | | TO | |
| ORIGINAL SYSTEM | | TO | |
| PERSON RESPONSIBLE | | TO | |

DEVELOPMENT OBJECT TYPE 430 | MDRS_BUSINESS_OBJECT
DEVELOPMENT OBJECT INSTANCE 440 | FIA_FIXED_ASSET | TO |

PREVIOUS VERSION SELECTION 420

DATE/TIME 450 | 15.02.2011 | 00:00:00

FIG. 4

| PROFILES OVERVIEW 505 | | |
|---|---|---|
| DIALOGUE STRUCTURE 510 | VERSION COMPARISON PROFILES 515 | |
| ▼ 🗁 VERSION COMPARISON PROFILES 515 | DEVELOPMENT OBJECT NAME 525 | PROFILE NAME 530 | DESCRIPTION 535 |
| ☐ PROFILE DEFINITION 520 | FIA_FIXED_ASSET | STRC | STRUCTURAL CHANGES |

PROFILE BASED VERSION COMPARISON

FIELD

Embodiments generally relate to computer systems and more particularly to methods and systems to compare different versions of a development object based on a version comparison profile.

BACKGROUND

Typically, business requirements change over time to satisfy customer needs. In this regard, computer software is modified to meet the changed business requirements. These modifications can result in different versions of same computer software (i.e., source code). Every version can include one or more unique differences compared to other versions to meet business requirements or to improvise the previous software version. Many a times, it is important to know the significant differences between the different versions of same computer software for analyzing software lifecycle aspects within the same release and across different releases.

Generally, software versions are compared on a textual basis by using standard tools. Such method of comparison allows convenient visualization of the differences between the software versions. However, a metadata repository supports a plurality of different domain specific development objects (i.e., metadata object types). Further, changes to the content of the metadata repository may have significant impact on the functional aspects of a business application, user interface and the like. To compare the different versions of the development object using standard version comparison, the whole development object is taken into account. Further, the standard version comparison detects all differences, which leads to a huge list of differences and is a time consuming process to analyze the differences manually. Also, the development objects are not only based on source code, but a significant amount of information is available in the form of the structure of the development objects. As a disadvantage, there is no evaluation or ranking of the severity of differences and there is no filtering mechanism to search only for specific differences (e.g., to detect incompatible changes, to detect important structural changes such as enhancements and the like). Therefore, it is desirable to provide a method which enables comparison of the different versions of the development object based on the specific difference (e.g., structural change, behavioral change and the like).

SUMMARY

Various embodiments of systems and methods to compare different versions of a development object based on a version comparison profile are described herein. In one aspect, identities of the different versions of the development object are received. Further, a version comparison profile and a corresponding profile definition associated with the development object are received. Furthermore, the different versions of the development object are compared to determine one or more differences based upon the received version comparison profile and the corresponding profile definition. The determined one or more differences between the different versions of the development object are returned.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques to compare different versions of a development object based on a version comparison profile are described herein. The development object can be an individual part of an application stored in a metadata repository such as a process component, a data type, a business object, a process agent and the like. In one embodiment, the version comparison profile defines a profile name, such as structural changes, behavioral changes, functional changes and the like, for which the different versions of the development object are compared.

According to one embodiment, different versions of the development object are compared based on the version comparison profile and corresponding profile definition. The corresponding profile definition defines different kinds of changes, such as delete, create and update, to specific parts of the development object. The version comparison profile and the corresponding profile definition are provided by a user. The user refers to an agent, a human or other mechanism capable of providing input to a computer system. The computer system can be desktop computers, work stations, laptop computers, hand held computers, smart phone, console devices or similar portable computing systems. Since the comparison is done using the version comparison profile and the corresponding profile definition, specific differences as desired by the user can be analyzed. Therefore, the overall changes existing between the different versions of the development object are filtered to display major and important changes as desired by the user.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
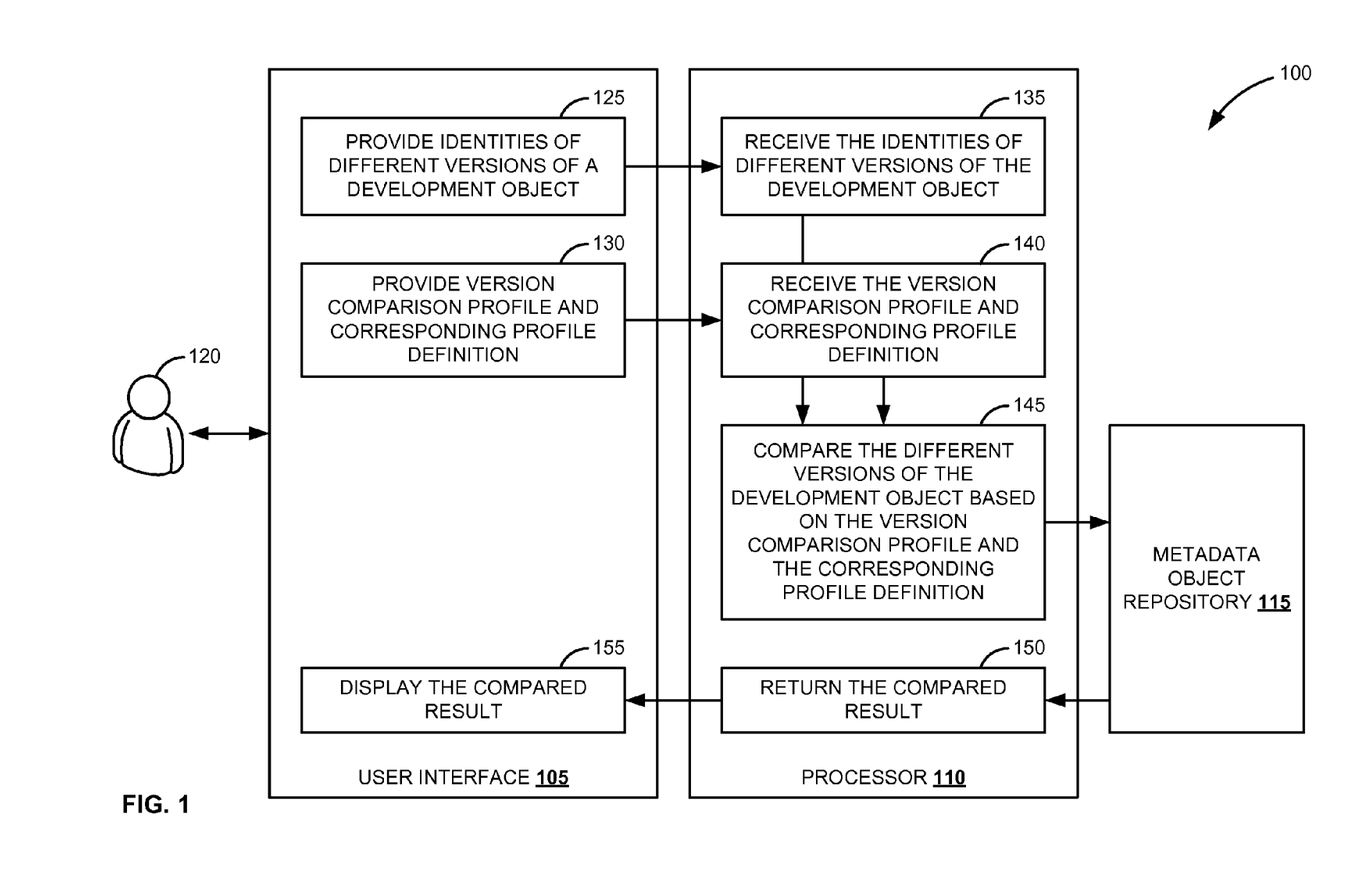
FIG. 1 is a functional block diagram illustrating a system to compare different versions of a development object, according to an embodiment.

FIG. 1 is a functional block diagram illustrating a computer system 100 to compare different versions of a development object, according to an embodiment. The computer system includes a computer generated user interface 105, a processor 110 and one or more memory devices (e.g., metadata object repository 115). The user interface 105 is generally a means for providing an interface for a user 120 to interact with the computer system 100. The behavior of the user interface 105 may be governed by computer executable instructions that are executed when the user 120 interacts with the user interface 105.

In one embodiment, the user interface 105 provides an option for the user 120 to provide identities of different versions of the development object to be compared (e.g., 125). In other words, the option is provided to input names or labels of the different versions of the development object to be compared. Further, the user interface 105 provides an option for the user to provide a version comparison profile and a corresponding profile definition (e.g., 130). The version comparison profile and the corresponding profile definition define the kinds of changes to be determined between the different versions of the development object. The version comparison profile and the corresponding profile definition are explained in greater detail in FIGS. 2, 5A and 5B.

The processor 110 generally assists the user to implement a method to compare the different versions of the development object. At step 135, the identities of different versions of the development object to be compared are received. At step 140, the version comparison profile and the corresponding profile definition are received (explained with an example in FIGS. 2, 5A and 5B). Further, at step 145, the different versions of the development object are compared based on the version comparison profile and the corresponding profile definition using the metadata object repository 115. The metadata object repository 115 can include one or more development objects such as a process component, a data type, a business object and a process agent. The metadata object repository 115 may be stored in a physical location or may be a virtual database, in which the content of the metadata object repository 115 is drawn from separate sources. At step 150, the compared result is returned, which is displayed in the user interface 105 (e.g., 155).

Figure 2:
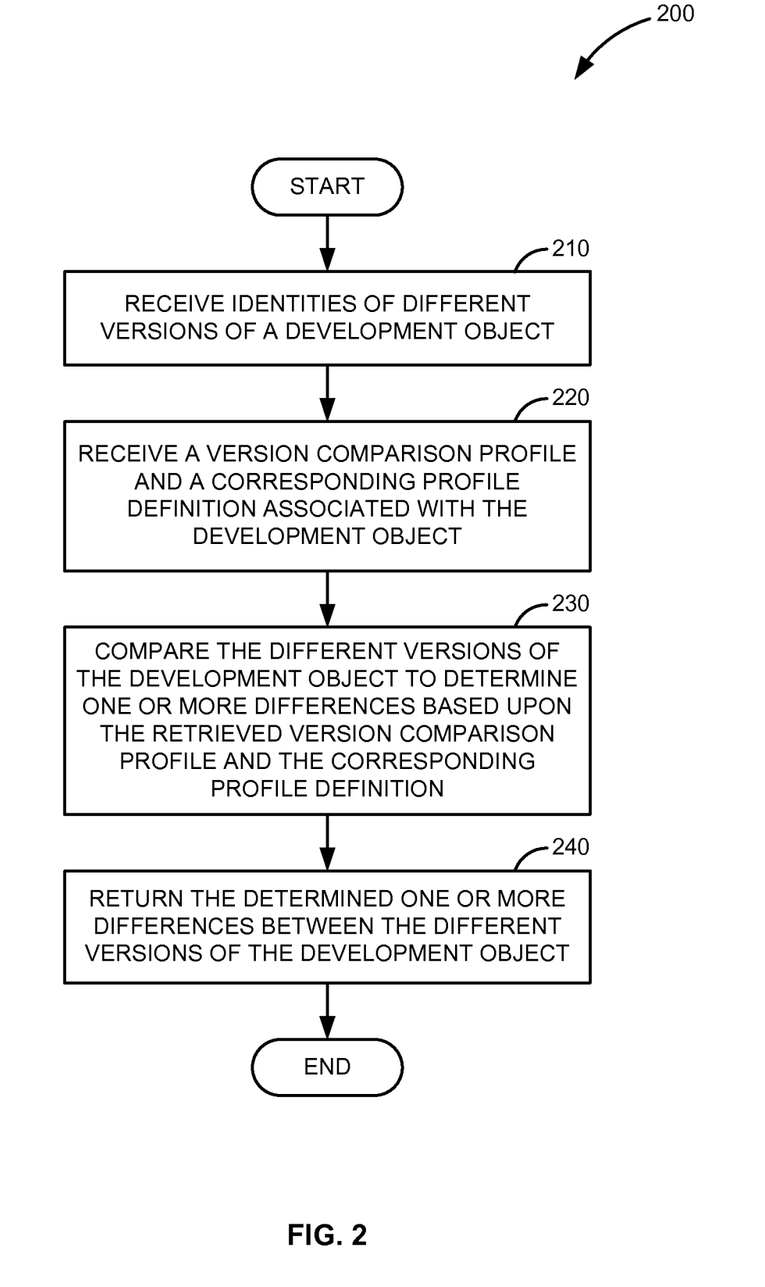
FIG. 2 is a flow diagram illustrating a method to compare different versions of a development object, according to an embodiment.

FIG. 2 is a flow diagram 200 illustrating a method to compare different versions of a development object, according to an embodiment. At step 210, identities of the different versions of the development object to be compared are received. The different versions can include a current version of the development object and one or more previous versions of the development object. In one exemplary embodiment, the development object can include a domain specific metadata object stored in a metadata repository. The development object can include at least one of a process component, a data type, a business object and a process agent. For example, identities of two different versions of a business object 'Fixed Asset' with technical name 'FIA_FIXED_ASSET' (e.g., using date of release and the like) are received.

At step 220, a version comparison profile and a corresponding profile definition associated with the development object are received. In one embodiment, the version comparison profile includes a profile name associated with the development object for which the different versions of the development object are compared. For example, the different versions of the development object can be compared for structural changes, behavioral changes, functional changes and the like. The version comparison profile associated with the development object is predefined using a metadata object model.

In one embodiment, the corresponding profile definition defines relevance of different kinds of changes (e.g., delete, create and update) to specific parts of the development object performed in different versions. For example, if the user desires to know the list of node elements which are deleted from the previous version, then the user can set the version comparison profile as 'structural change' and corresponding profile definition as 'deletion of node element'. An example is described in greater detail in FIGS. 3A to 6.

At step 230, the different versions of the development object are compared to determine one or more differences based upon the received version comparison profile and the corresponding profile definition. For example, the structural changes (including deletion of node elements) between the two different versions of the business object 'FIA_FIXED_ASSET' are determined. Therefore, the type of differences as desired by the user is returned instead of all the differences existing between the different versions of the development object.

At step 240, the determined one or more differences between the different versions of the development object are returned. The returned compared results are displayed to the user. For example, the deleted node elements (with respect to comparison of two different versions of the 'FIA_FIXED_ASSET' business object) are displayed. The method described in FIG. 2 is explained with an example in FIGS. 3A to 6.

Figure 3A:
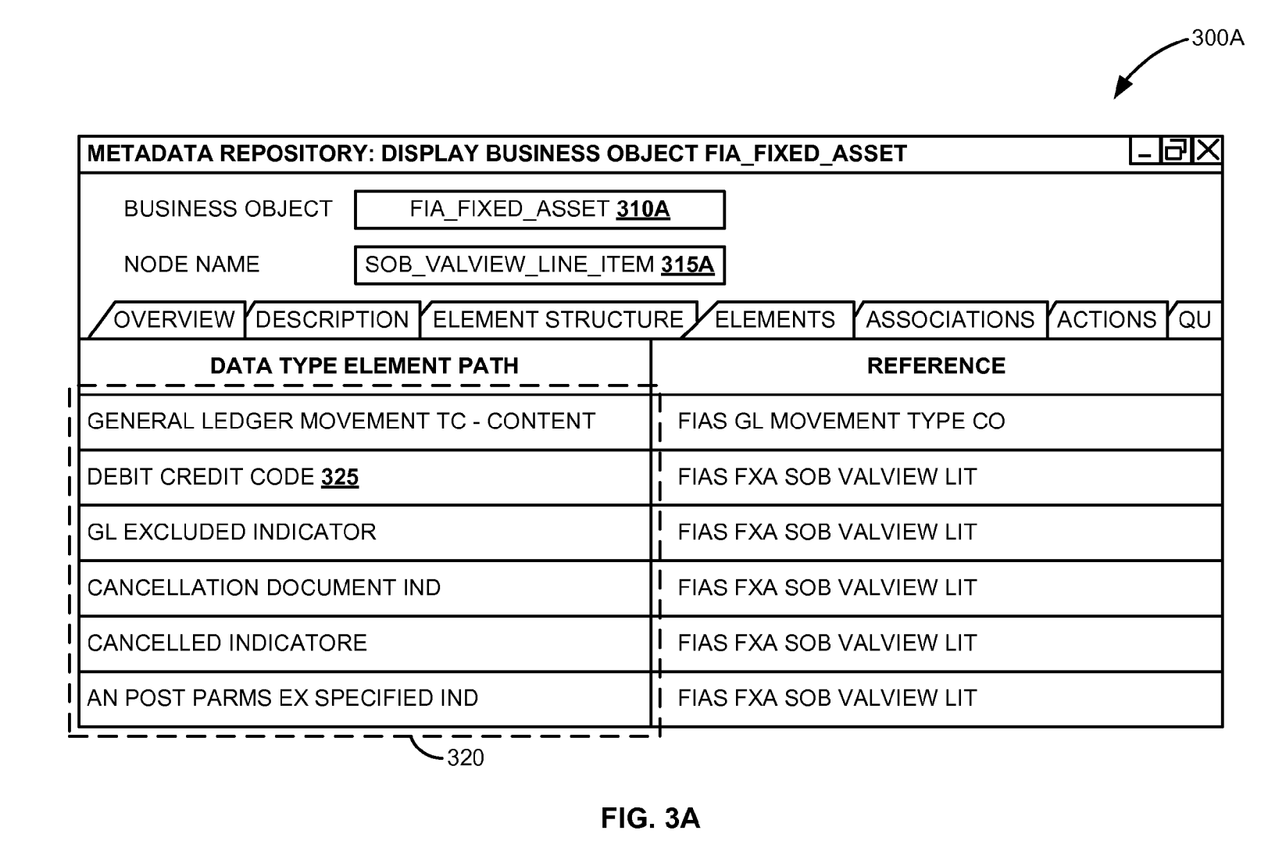
FIGS. 3A and 3B are exemplary user interfaces displaying two versions of a development object, according to an embodiment.
Figure 3B:
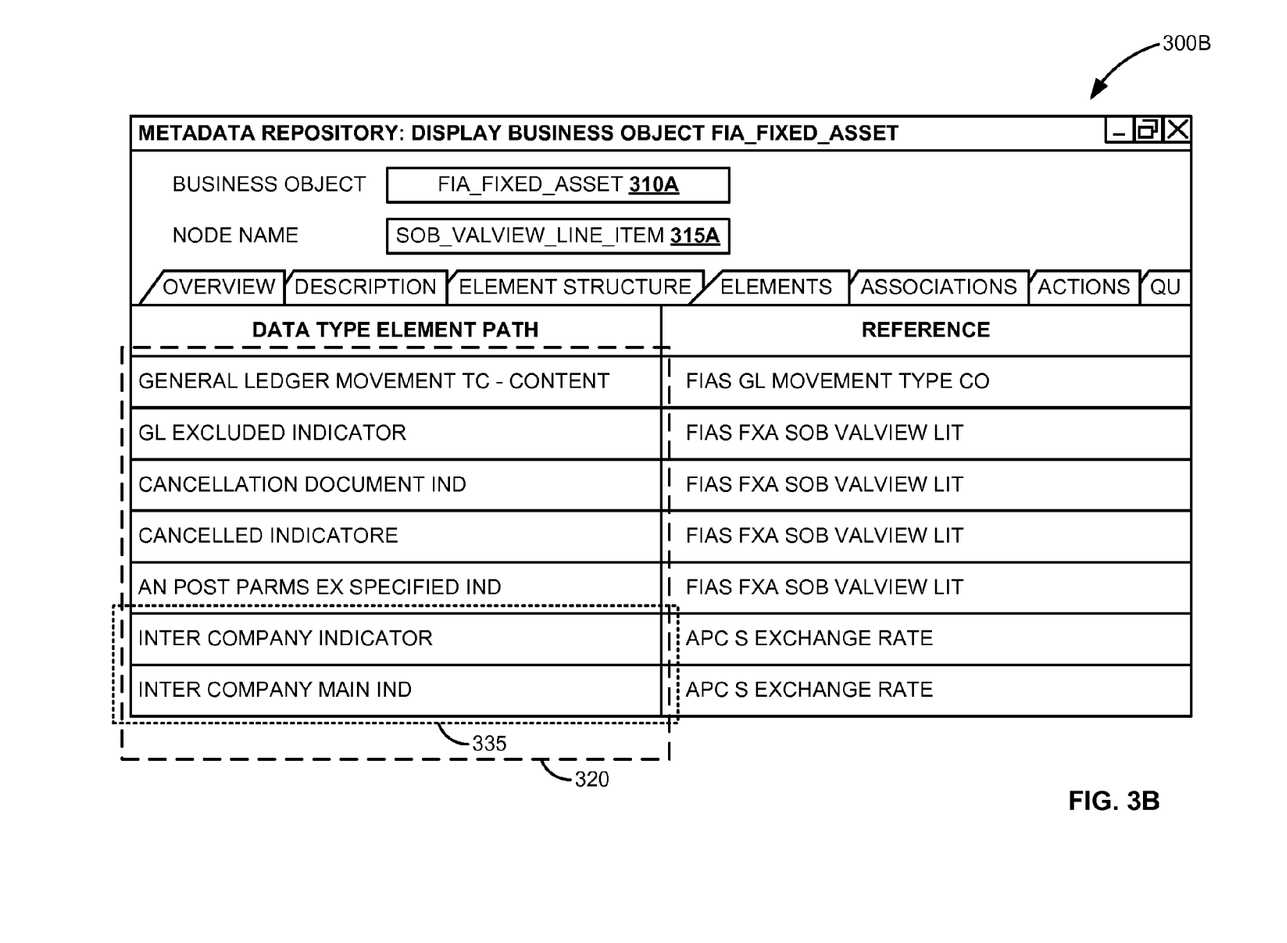

FIGS. 3A and 3B are exemplary user interfaces (300A and 300B) displaying two versions of a development object, according to an embodiment. In one exemplary embodiment, a business object is considered as the development object for describing the method described in FIG. 2. Typically, the business object includes two main aspects such as business object data structure and business object behavioral aspects. The metadata model for the business object may include a plurality of nodes containing a plurality of attributes. Further, an extract of the business object metadata model can be as follows:

```
{
    Root
        Node
            Node Element
            Action
                Action Parameter Element
            ...
}
```

Wherein, the root includes header information. The node and node elements are business object data structures. The action and action parameter elements are business object behavioral aspects. FIG. 3A displays an exemplary 'FIA_FIXED_ASSET' 310A business object. As an example, the 'FIA_FIXED_ASSET' 310A business object may include 17 nodes, 255 node elements, 18 actions and 14 action parameter elements. For simplicity, it is considered that the 'FIA_FIXED_ASSET' 310A business object includes node 'SOB_VALVIEW_LINE_ITEM' 315A and six node elements as shown in 320. The 'FIA_FIXED_ASSET' 310A business object is a copy of an older version (i.e., a copy of previous release of the business object).

FIG. 3B displays an exemplary 'FIA_FIXED_ASSET' 310B business object. The 'FIA_FIXED_ASSET' 310B business object includes node 'SOB_VALVIEW_LINE_ITEM' 315B and seven node elements as shown in 320. The 'FIA_FIXED_ASSET' 310B business object is a copy of a current version (i.e., a copy of new release of the business object). Two new node elements 'INTER COMPANY INDICATOR' and 'INTER COMPANYMAIN IND' are added to the current version as shown in 335 when compared to the older version (e.g., as displayed in FIG. 3A). Further, a node element 'DEBIT CREDIT CODE' 325 is deleted in the current version (e.g., as displayed in FIG. 3B) when compared to the older version (e.g., as displayed in FIG. 3A). An example to determine the changes, as desired by a user, between the two versions (e.g., as displayed in FIGS. 3A and 3B respectively) is described in FIGS. 4 to 6.

Figure 4:
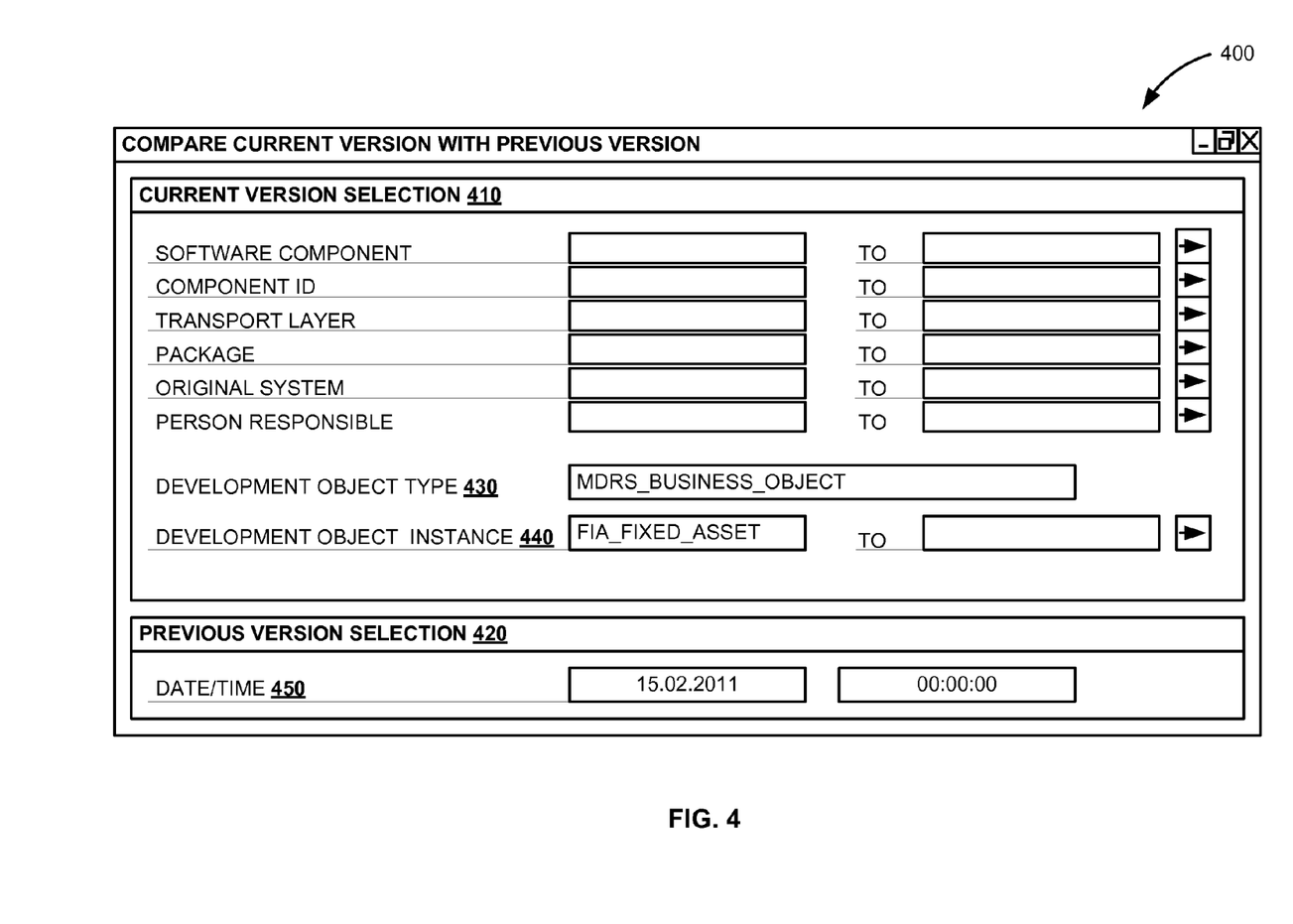
FIG. 4 is an exemplary user interface for providing identities of different versions of a development object to be compared, according to an embodiment.

FIG. 4 is an exemplary user interface 400 for providing identities of different versions of a development object to be compared, according to an embodiment. The user interface 400 provides an option for a user to provide identities (e.g., name, label and the like) of the different versions of the development object to be compared. Current version selection 410 of the user interface 400 provides an option for the user to input details of the current version of the development object (i.e., development object type 430 and development object instance 440). For example, the user may input the development object type 430 as 'MDRS_BUSINESS_OBJECT' and development object instance 440 as 'FIA_FIXED_ASSET'. Further, the other mentioned elements in the user interface 400 such as software component, component ID, transport layer, package, original system, and person responsible are attributes for the development object (i.e., independent of the type of the development object). In other words, the business object instance, process component instance and data type instance provides such attributes to support a mass comparison (i.e., a plurality of development objects can be compared to their respective older version). In FIG. 4, the displayed selection criteria in the user interface 400 specify one development object, because development object instance 440 is explicitly given. However, it would be also possible to let this field empty and select all business objects of a given software component.

Further, previous version selection 420 of the user interface 400 provides an option for the user to input details of the older version of the development object, which has to be compared with the version of the development object as specified in the current version selection 410. For example, an option date/time 450 is provided to input the previous version details (i.e., date and time of the release of the previous version). Thus, the current version of the development object as mentioned in the current version selection 410 is compared with the previous version of the development object as mentioned in the previous version selection 420 based on a version comparison profile and a corresponding profile definition. Defining the version comparison profile and the corresponding profile definition are described in FIGS. 5A and 5B respectively.

Figure 5A:
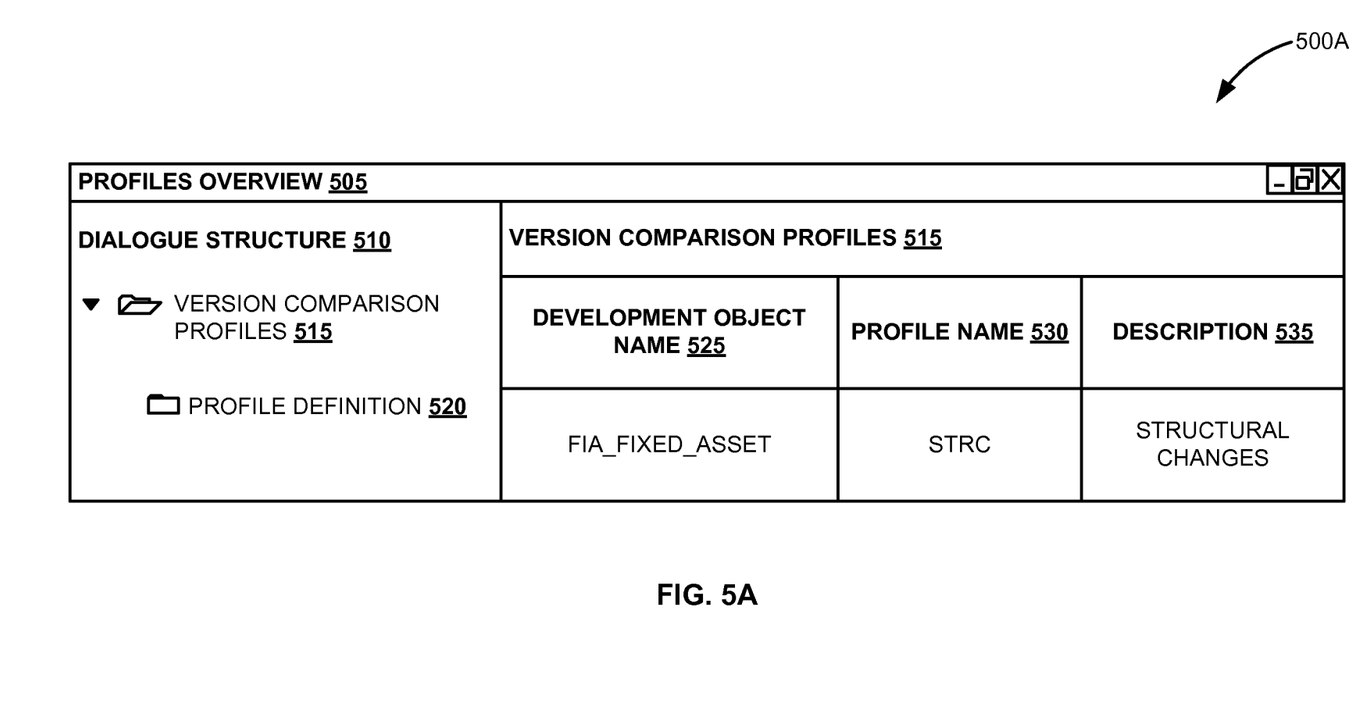
FIGS. 5A and 5B are exemplary user interfaces for providing a version comparison profile and a corresponding profile definition, according to an embodiment.
Figure 5B:
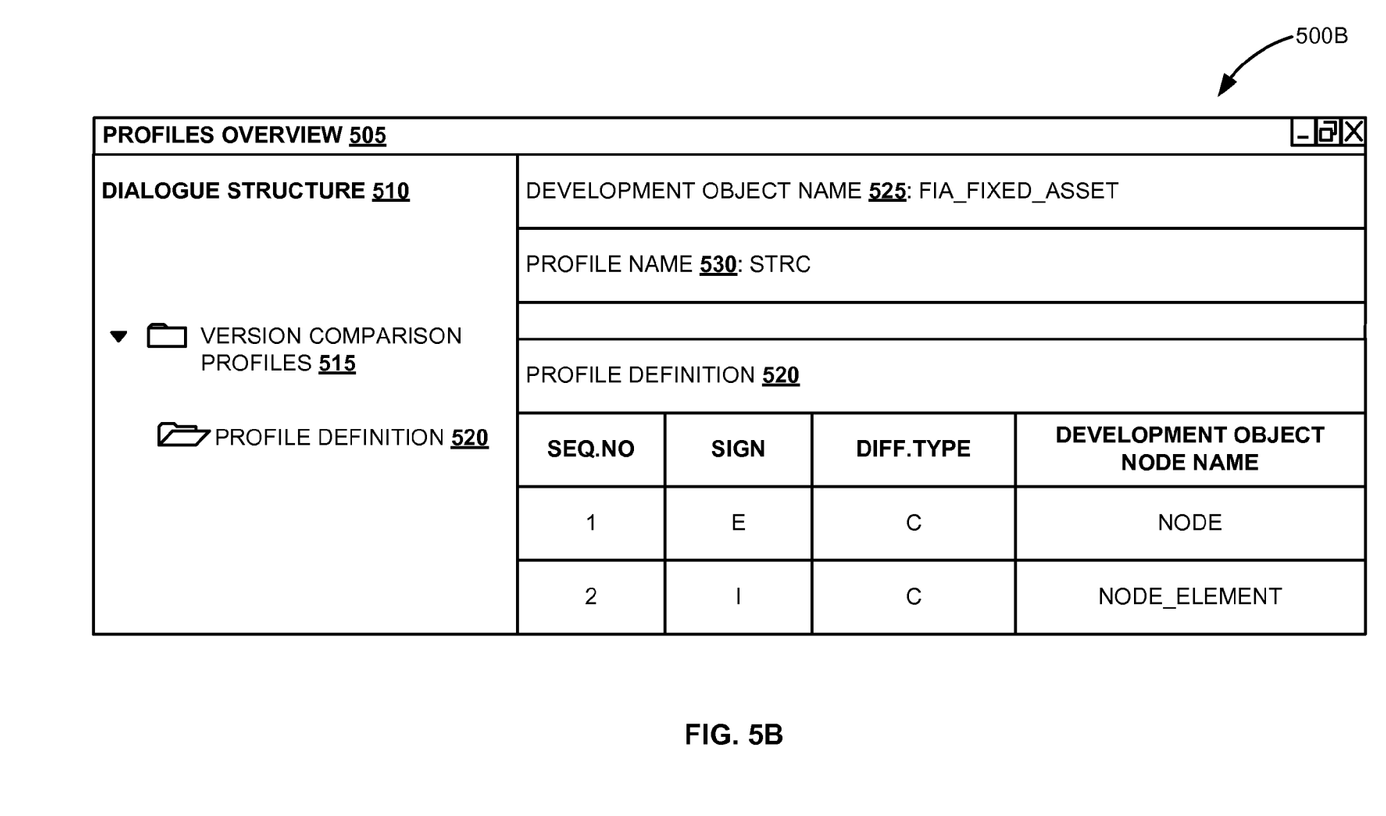

FIGS. 5A and 5B are exemplary user interfaces (500A and 500B) for providing a version comparison profile and a corresponding profile definition, according to an embodiment. FIG. 5A is the exemplary user interface 500A for providing the version comparison profile. In one embodiment, the version comparison profile includes a profile name associated with a development object for which the different versions of the development object are compared. The user interface 500A provides an option to a user to input the version comparison profile. In one exemplary embodiment, a profile overview 505 displays two portions on the user interface 500A. The first portion displays a dialogue structure 510 and the second portion display the details of the options selected under the dialogue structure 510. The dialogue structure 510 enables the user to provide details for version comparison profile 515 and corresponding profile definition 520.

In the user interface 500A, the version comparison profile 515 is selected and thus the second portion displays version comparison profile 515. The version comparison profile 515 includes details such as development object name 525, profile name 530 and description 535. For example, 'FIA_FIXED_ASSET' is selected as the development object name 525, 'STRC' as the profile name 530 and 'structural changes' as the description 535. Therefore, the 'STRC' (structural changes) between the current version (as shown in FIG. 3B) and the previous version (as shown in FIG. 3A) of the development object are determined based on the corresponding profile definition. The profile definition is described in FIG. 5B.

FIG. 5B is the exemplary user interface 500B for providing the profile definition. In one exemplary embodiment, when the profile definition 520 is selected, the second portion displays the profile definition 520. The profile definition 520 defines relevance of different kinds of changes to specific parts of the development object performed in different versions of the development object. The profile definition 520 provides an option to the user to provide relevance of different kinds of changes such as create (C), delete (D) and update (U). For example, the user provides the profile definition 520 specifying to include creation (C) of node and node elements in the comparison result. Therefore, create (C) operation is declared as relevant for the comparison of different versions. The delete (D) and update (U) operations are not considered for comparison of different versions. In other words, creation of node and node elements is considered while comparing the different versions. Further, other attributes such as actions, action parameters, and the like of the business object are not considered while comparing the different versions of the business object. In one exemplary embodiment, a sign can be provided to state whether to include (I) or exclude (E) the kind of change. For example, creation (C) of the node is excluded (E) and creation (C) of the node element is included (I) for comparing the different versions of the development object.

Therefore, the two versions of the development object 'FIA_FIXED_ASSET' business object (as described in FIGS. 3A, 3B and 4) are compared for 'STRC' (structural changes) (as described in FIG. 5A) including creation (C) of node elements (as described in FIG. 5B). The display of the comparison result is described in FIG. 6.

Figure 6:
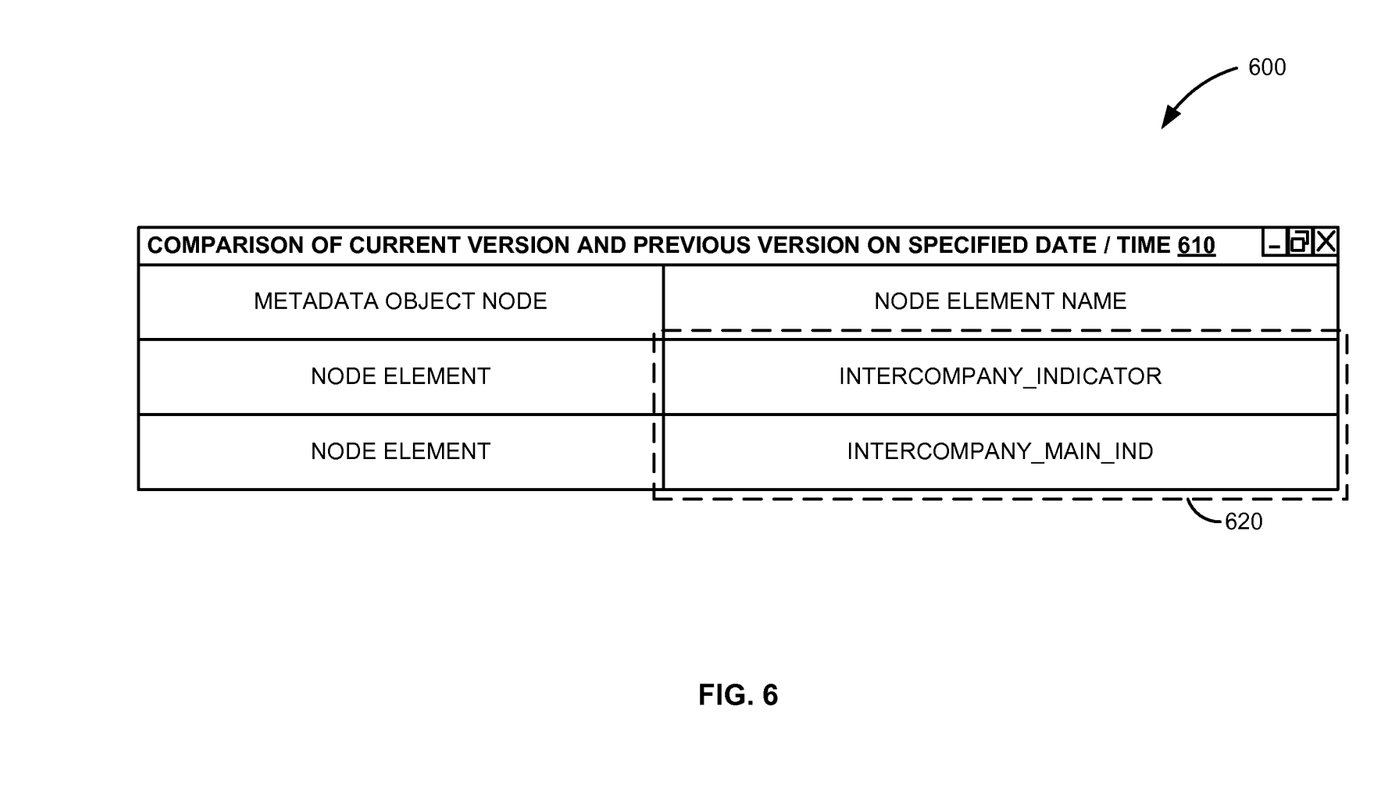
FIG. 6 is an exemplary user interface displaying differences between the two versions of the development object as shown in FIGS. 3A and 3B, according to an embodiment.

FIG. 6 shows an exemplary user interface 600 displaying differences between the two versions of the development object as shown in FIGS. 3A and 3B, according to an embodiment. Comparison of the current version (as described in FIG. 3B) and the previous version (as described in FIG. 3A) on specified date/time 610 displays the 'STRC' (structural changes) (as described in FIG. 5A) including creation (C) of node elements (as described in FIG. 5B) when the current version (as described in FIG. 3B) and the previous version (as described in FIG. 3A) are compared. Thereby, the node elements 'INTER COMPANY INDICATOR' and 'INTER COMPANYMAIN IND' are displayed as shown in 620. Therefore, the kind of change as desired by the user is displayed in the user interface 600. For example, even though the node element 'DEBIT_CREDIT_CODE' 325 is deleted (D) in the current version (as displayed in FIG. 3B), the user interface 600 does not display the node element 'DEBIT_ CREDIT_CODE' 325 as the profile definition is defined to include (I) addition of node elements and not deletion (D) of node element (as described in FIG. 5B). In one exemplary embodiment, annotations can be included to rank severity of the changes. For example, deletion of a node element can be highlighted as deletion of the node element is considered more critical than an insertion of the node element.

It is advantageous to compare different versions of the development object using version comparison profiles as incompatible changes between different versions can be deleted (e.g., if deletion is considered as incompatible change, then only deletion of the development object attributes can be determined). Further, important structural changes including enhancements can be determined. For example, if an attribute is added to the development object, then corresponding changes has to be performed in the user interface. Therefore, detection of enhancements is advantageous and is achieved by comparing the different versions using the version comparison profile. Furthermore, specific changes (e.g. ad-hoc analysis) of the progress of a mass change can be detected. For example, specific kind of change or specific interested property can be highlighted using the version comparison profiles. Therefore, the most important changes in the different versions of the development object are determined by an efficient and simplified version comparison method using version comparison profiles, specific to the development object.

Further, the method of comparison of different versions of the development object is described using business object as an example for the development object. However, the development object is not restricted to the business object and the business object can be replaced by other metadata object types stored in a metadata object repository (e.g., a process component, a data type, a process agent and the like). For example, considering process component (e.g., financial accounting) as the development object, business process variants acts as a node of the process component metadata object. Thus, deletion, creation and updates of the business process variants can be determined using the method as described in FIG. 2.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
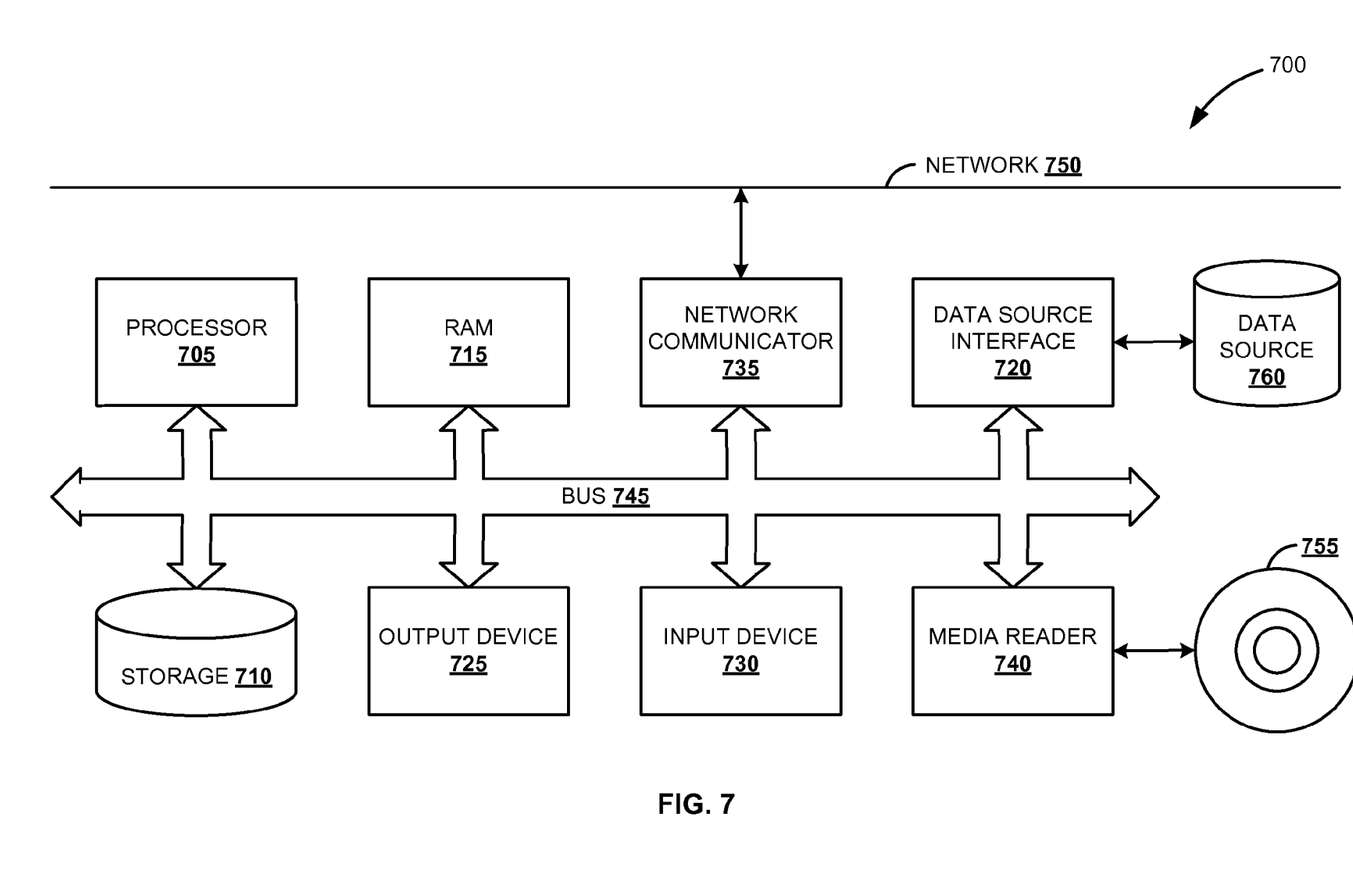
FIG. 7 is a block diagram illustrating a computing environment in which the techniques described to compare different versions of a development object, according to an embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to physically store instructions, which when executed by a computer, cause the computer to:
   receive identities of different versions of a development object to be compared;
   receive a version comparison profile and a corresponding profile definition associated with the development object;
   compare the different versions of the development object to determine one or more differences based upon the received version comparison profile and the corresponding profile definition; and
   return the determined one or more differences between the different versions of the development object.

2. The article of manufacture of claim 1, wherein the different versions comprise a current version of the development object and one or more previous versions of the development object.

3. The article of manufacture of claim 1, wherein the development object comprises a domain specific metadata object stored in a metadata repository.

4. The article of manufacture of claim 3, wherein the development object comprises at least one of a process component, a data type, a business object and a process agent.

5. The article of manufacture of claim 1, wherein the version comparison profile comprises a profile name associated with the development object for which the different versions of the development object are compared.

6. The article of manufacture of claim 5, wherein the version comparison profile associated with the development object is predefined using a metadata model.

7. The article of manufacture of claim 1, wherein the corresponding profile definition defines relevance of different kinds of changes to specific parts of the development object performed in different versions of the development object.

8. A computer implemented method to compare different versions of a development object using a computer, the method comprising:
   receiving, from a computer generated user interface, an identity of the different versions of the development object to be compared;
   receiving, from the computer generated user interface, a version comparison profile and a corresponding profile definition associated with the development object;
   comparing, the computer, the different versions of the development object to determine one or more differences based upon the retrieved version comparison profile and the corresponding profile definition; and
   displaying the determined one or more differences between the different versions of the development object.

9. The computer implemented method of claim 8, wherein the different versions comprise a current version of the development object and one or more previous versions of the development object.

10. The computer implemented method of claim 8, wherein the development object comprises a domain specific metadata object stored in a metadata repository.

11. The computer implemented method of claim 10, wherein the development object comprises at least one of a process component, a data type, a business object and a process agent.

12. The computer implemented method of claim 8, wherein the version comparison profile comprises a profile name associated with the development object for which the different versions of the development object are compared.

13. The computer implemented method of claim 12, wherein the version comparison profile associated with the development object is predefined using a metadata model.

14. The computer implemented method of claim 8, wherein the corresponding profile definition defines relevance of different kinds of changes to specific parts of the development object performed in different versions of the development object.

15. A computer system to compare different versions of a development object, the computer system comprising a processor, the processor communicating with one or more memory devices storing instructions to:

receive identities of the different versions of the development object to be compared;

receive a version comparison profile and a corresponding profile definition associated with the development object;

compare the different versions of the development object to determine one or more differences based upon the retrieved version comparison profile and the corresponding profile definition; and display the determined one or more differences between the different versions of the development object.

16. The computer system of claim 15, wherein the different versions comprise a current version of the development object and one or more previous versions of the development object.

17. The computer system of claim 15, wherein the development object comprises a domain specific metadata object stored in a metadata repository.

18. The computer system of claim 17, wherein the development object comprises at least one of a process component, a data type, a business object and a process agent.

19. The computer system of claim 15, wherein the version comparison profile comprises a profile name associated with the development object for which the different versions of the development object are compared.

20. The computer system of claim 15, wherein the corresponding profile definition defines relevance of different kinds of changes to specific parts of the development object performed in different versions of the development object.

* * * * *